US012183497B2

(12) United States Patent
Chen et al.

(10) Patent No.: US 12,183,497 B2
(45) Date of Patent: Dec. 31, 2024

(54) HIGH-INSULATION MULTILAYER PLANAR TRANSFORMER AND CIRCUIT BOARD INTEGRATION THEREOF

(71) Applicant: P-DUKE TECHNOLOGY CO., LTD., Taichung (TW)

(72) Inventors: Lien-Hsing Chen, Taichung (TW); Hsiao-Hua Chi, Taichung (TW); Chun-Ping Chang, Taichung (TW); Han-Chiang Chen, Taichung (TW); Chia-Ti Lai, Taichung (TW); Yung-Chi Chang, Taichung (TW)

(73) Assignee: P-DUKE TECHNOLOGY CO., LTD., Taichung (TW)

( * ) Notice: Subject to any disclaimer, the term of this patent is extended or adjusted under 35 U.S.C. 154(b) by 261 days.

(21) Appl. No.: 17/132,278

(22) Filed: Dec. 23, 2020

(65) Prior Publication Data

US 2022/0199314 A1 Jun. 23, 2022

(51) Int. Cl.
*H01F 27/28* (2006.01)
*H01F 27/24* (2006.01)
*H01F 27/32* (2006.01)

(52) U.S. Cl.
CPC ......... *H01F 27/2804* (2013.01); *H01F 27/24* (2013.01); *H01F 27/323* (2013.01)

(58) Field of Classification Search
CPC .... H01F 27/2804; H01F 27/24; H01F 27/323; H01F 27/324; H01F 2027/2819; H01F 2027/2809
See application file for complete search history.

(56) References Cited

U.S. PATENT DOCUMENTS 5,010,314 A * 4/1991 Estrov ................. H01F 27/2804 336/200
5,559,487 A * 9/1996 Butcher ................ H01F 41/127 336/83
5,598,135 A * 1/1997 Maeda ................ H01F 17/0013 336/200

(Continued)

FOREIGN PATENT DOCUMENTS

TW 200839800 A 10/2008
TW I637412 B 10/2018

OTHER PUBLICATIONS

Office Action dated Dec. 13, 2021 of the corresponding German patent application No. 102020134823.1.

*Primary Examiner* — Mang Tin Bik Lian
(74) *Attorney, Agent, or Firm* — Chun-Ming Shih; HDLS IPR SERVICES

(57) ABSTRACT

A high-insulation multilayer planar transformer (1) includes a pair of iron cores (20) and a circuit board integration (10*a*). The circuit board integration (10*a*) is stacked between the iron cores (20) and has a through hole (100*a*). The circuit board integration (10*a*) includes a first to a third insulating layers (11*a*, 12*a*, 14*a*) and a first to a second coil windings (13*a*, 15*a*). The first and third insulating layers (11*a*, 14*a*) include at least two insulating plates (111*a*, 141*a*) stacked with each other respectively. The second insulating layer (12*a*) includes at least one insulating plate (121*a*). The coil winding (13*a*, 15*a*) is disposed between the adjacent insulating layers and surrounds the through hole (100*a*) planarly. Therefore, the reinforced insulation requirement of safety regulations may be achieved.

6 Claims, 5 Drawing Sheets

(56) References Cited

U.S. PATENT DOCUMENTS

| | | | | |
|---|---|---|---|---|
| 6,198,374 | B1 * | 3/2001 | Abel | H01F 17/0013 336/200 |
| 8,928,449 | B2 * | 1/2015 | Silva | H01F 3/14 336/84 R |
| 2004/0032313 | A1 * | 2/2004 | Ferencz | H01F 27/266 336/200 |
| 2005/0068148 | A1 | 3/2005 | Yoshida et al. | |
| 2005/0118969 | A1 | 6/2005 | Shoji | |
| 2010/0079233 | A1 | 4/2010 | Koprivnak et al. | |
| 2011/0241816 | A1 * | 10/2011 | Park | H01F 41/34 336/200 |
| 2011/0316658 | A1 | 12/2011 | Liu | |
| 2013/0222101 | A1 * | 8/2013 | Ito | H01F 3/08 336/83 |
| 2013/0271253 | A1 * | 10/2013 | Nishikawa | H01F 27/008 336/200 |
| 2013/0321117 | A1 * | 12/2013 | Park | H01F 27/2804 336/200 |
| 2015/0022306 | A1 * | 1/2015 | Scholz | H01F 27/2804 336/200 |

* cited by examiner

HIGH-INSULATION MULTILAYER PLANAR TRANSFORMER AND CIRCUIT BOARD INTEGRATION THEREOF

BACKGROUND OF THE INVENTION

Technical Field

The technical field relates to a transformer, and more particularly relates to a planar transformer.

Description of Related Art

Windings of a planar transformer generally adapts double layer or multi-layer printed circuit boards, or adapts prefabricated planar copper plates. In addition, the windings include a primary coil and a secondary coil, and the primary coil and the secondary coil need to meet the safety regulations of transformers such as clearance and creepage, etc.

Moreover, in order to meet the reinforced insulation requirement of safety regulations, the primary and secondary coils need to maintain certain distance. Thus, it is difficult to reduce the volume of planar transformers to meet the trend of miniaturization.

In view of the above drawbacks, the inventor proposes this disclosure based on his expert knowledge and elaborate researches in order to solve the problems of related art.

SUMMARY OF THE INVENTION

It is an object of this disclosure to provide a high-insulation multilayer planar transformer and circuit board integration thereof, so as to meet the safety regulations and the reinforced insulation requirement of transformers.

In order to achieve the object mentioned above, this disclosure provides a high-insulation multilayer planar transformer and circuit board integration thereof. The high-insulation multilayer planar transformer includes a pair of iron cores and a circuit board integration. The circuit board integration is stacked between the first iron core and the second iron core and includes a through hole. The circuit board integration includes a first insulating layer, a second insulating layer, a first coil winding, a third insulating layer and a second coil winding. The first insulating layer includes at least two first insulating plates stacked with each other. The second insulating layer includes at least one second insulating plate. The first coil winding is disposed between the first insulating layer and the second insulating layer, and the first coil winding surrounds the through hole planarly. The third insulating layer includes at least two third insulating plates stacked with each other. The second coil winding is disposed between the second insulating layer and the third insulating layer, and the second coil winding surrounds the through hole planarly.

Comparing to the related art, the circuit board integration of this disclosure includes a first insulating layer, a second insulating layer, a first coil winding, a third insulating layer and a second coil winding disposed sequentially. The first insulating layer includes at least two first insulating plates stacked with each other, and the first insulating plate disposed on the outside portion (the side facing the iron core) is not provided with any circuit. In addition, the third insulating layer includes at least two third insulating plates stacked with each other, and the third insulating plate disposed on the outside portion (the side facing the iron core) is not provided with any circuit. Therefore, the high-insulation multilayer planar transformer may meet the reinforced insulation requirement of safety regulations, and the volume of the planar transformer may be reduced to satisfy the trend of miniaturization to enhance the practicability of this disclosure.

BRIEF DESCRIPTION OF DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION OF THE PREFERRED EMBODIMENTS

In cooperation with attached drawings, the technical contents and detailed description of the disclosure are described thereinafter according to a number of embodiments, being not used to limit its executing scope. Any equivalent variation and modification made according to appended claims is all covered by the claims claimed by this disclosure.

Figure 1:
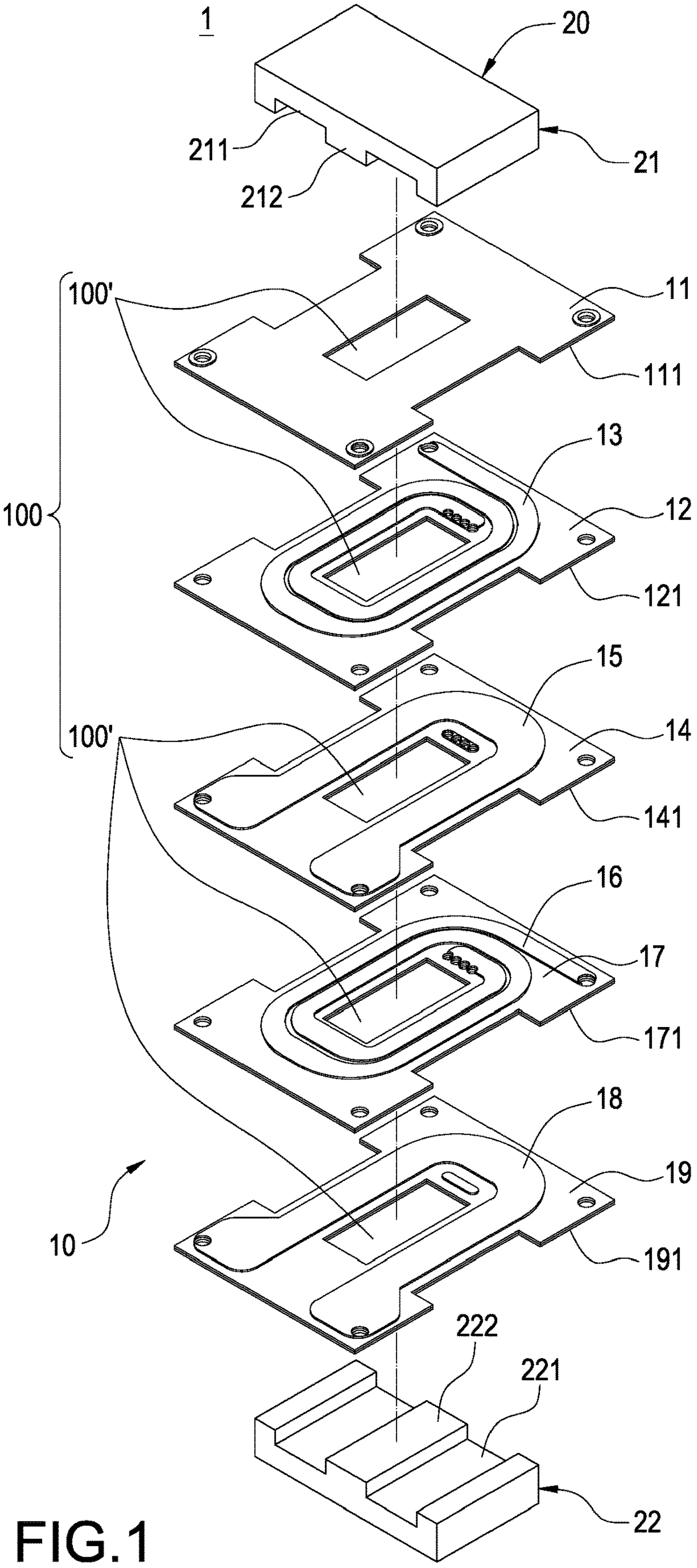
FIG. 1 is a perspective explosion view of the high-insulation multilayer planar transformer of this disclosure.
Figure 2:
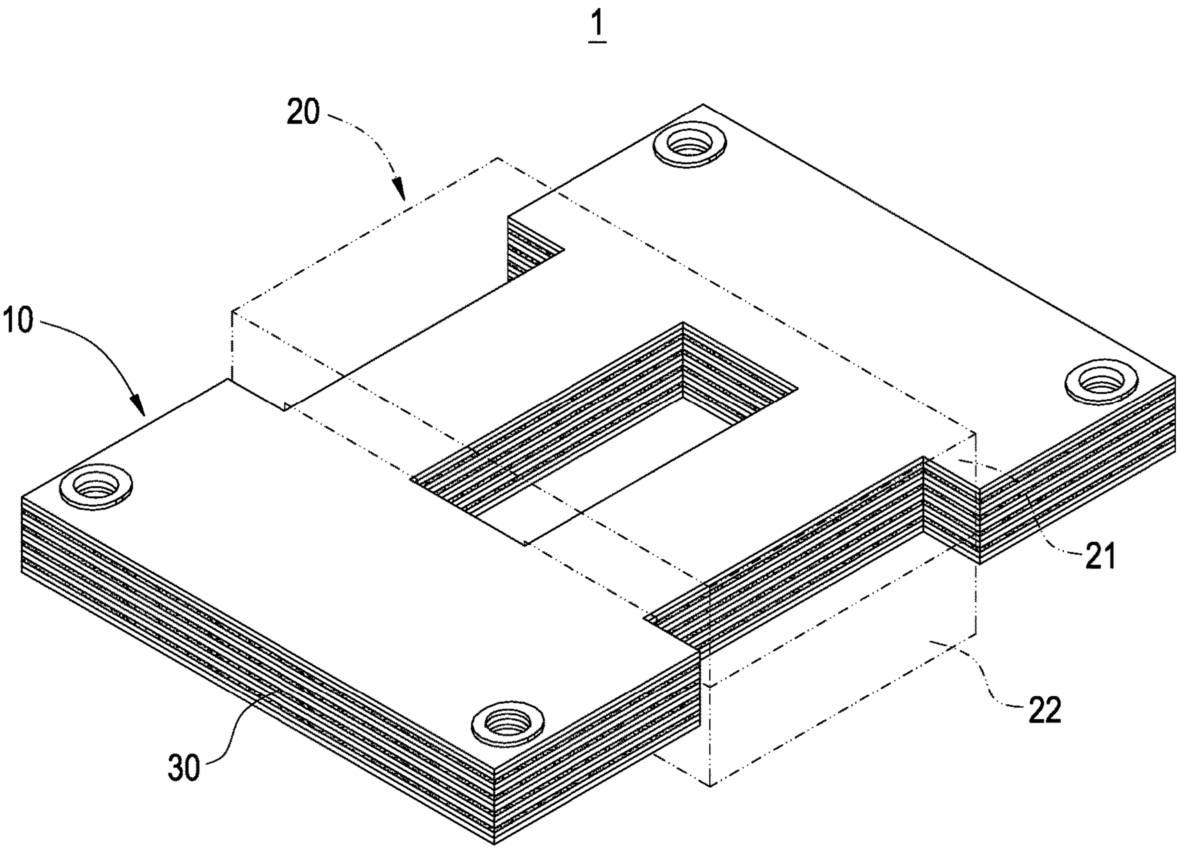
FIG. 2 is a perspective schematic view of the high-insulation multilayer planar transformer of this disclosure.
Figure 3:
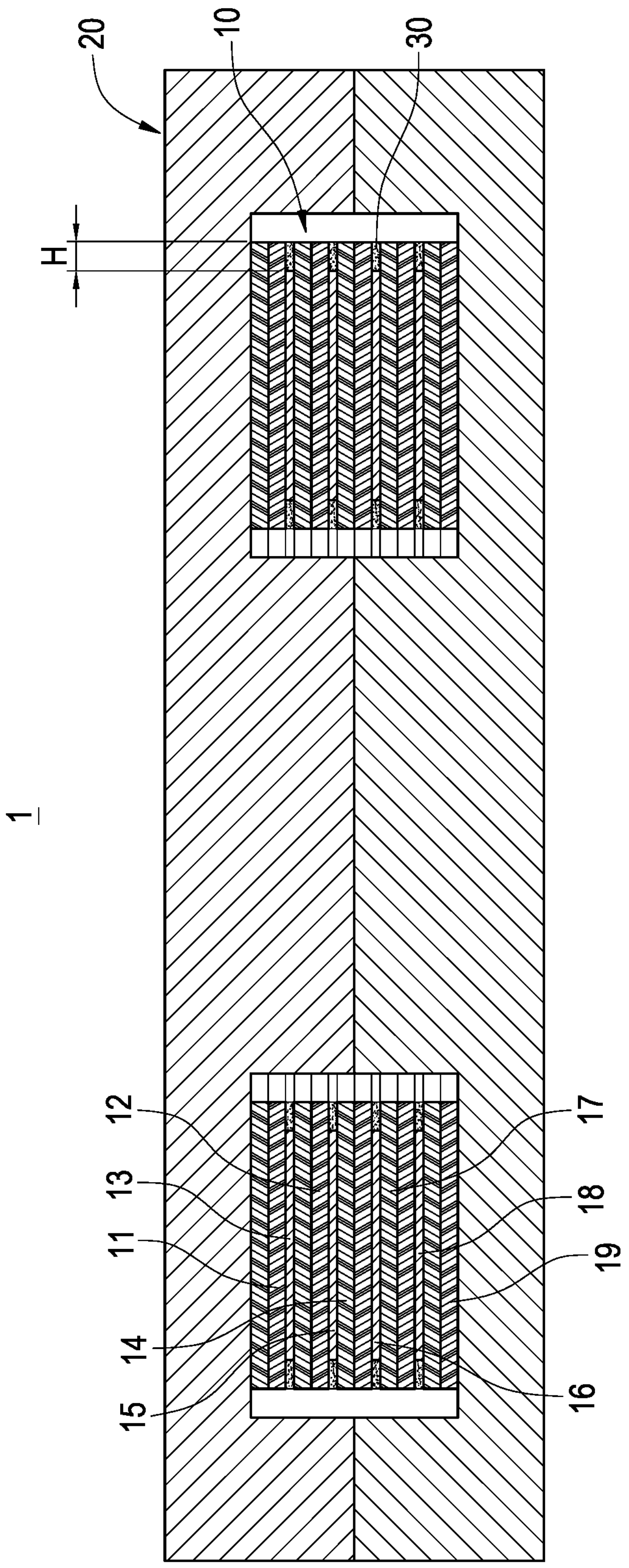
FIG. 3 is a cross sectional view of the high-insulation multilayer planar transformer of this disclosure.

Please refer to FIG. 1 to FIG. 3, which depict a perspective explosion view of the high-insulation multilayer planar transformer, a perspective schematic view of the high-insulation multilayer planar transformer and a cross sectional view of the high-insulation multilayer planar transformer of this disclosure. This disclosure provides a high-insulation multilayer planar transformer 1 includes a circuit board integration 10 and a pair of iron cores 20. The circuit board integration 10 is disposed between the pair of iron cores 20 to constitute the high-insulation multilayer planar transformer 1.

In one embodiment of this disclosure, the pair of iron cores 20 includes a first iron core 21 and a second iron core 22 arranged oppositely. The first iron core 21 includes a first base 211 and a first core pillar 212 connected to the first base 211. In addition, the second iron core 22 includes a second base 221 and a second core pillar 222 connected to the second base 221.

Moreover, the circuit board integration 10 is stacked between the first iron core 21 and the second iron core 22 and has a through hole 100. The through hole 100 is inserted with the first core pillar 212 and the second core pillar 222 of the pair of the iron cores 20.

The circuit board integration 10 includes a first insulating layer 11, a second insulating layer 12, a first coil winding 13, a third insulating layer 14, a second coil winding 15, a third coil winding 16, a fourth insulating layer 17, a fourth coil winding 18 and a fifth insulating layer 19. Furthermore, the first insulating layer 11, the first coil winding 13, the second insulating layer 12, the second coil winding 15, the third insulating layer 14, the third coil winding 16, the fourth insulating layer 17, the fourth coil winding 18 and the fifth insulating layer 19 are stacked sequentially to constitute the circuit board integration 10.

It should be noted that, the center of the first insulating layer 11, the center of the second insulating layer 12, the center of the first coil winding 13, the center of the third insulating layer 14, the center of the second coil winding 15, the center of the third coil winding 16, the center of the fourth insulating layer 17, the center of the fourth coil winding 18 and the center of the fifth insulating layer 19 are provided with a central hole 100' separately and correspondingly, and the through hole 100 of the integrated circuit board 10 is configured by the central holes 100'.

In this embodiment, the first insulating layer 11 includes at least two first insulating plates 111 stacked with each other. It is worth noticing that, the first insulating layer 11 may be configured to include two layers or three layers of first insulating plate 111, and the thickness of the first insulating layer 11 after being laminated is equal to or greater than 0.05 mm and equal to or less than 1.0 mm.

The second insulating layer 12 includes at least one second insulating plate 121. The second insulating layer 12 may be configured as a single-layer insulating plate or includes at least two second insulating plates 121 stacked with each other, such as double layers or triple layers of second insulating plates 121.

Furthermore, the first coil winding 13 is disposed between the first insulating layer 11 and the second insulating layer 12. The first coil winding 13 surrounds the through hole 100 (the central hole 100') planarly.

It should be noted that the first coil winding 13 may be disposed on the second insulating layer 12, or disposed on the first insulating plate 111 facing a side surface of the second insulating layer 12 in the first insulating layer 11.

The third insulating layer 14 includes at least two third insulating plates 141 stacked with each other. It should be noted that the third insulating layer 14 may be configured as a single-layer insulating plate or includes at least two third insulating plates 141 stacked with each other. For example, the third insulating layer 14 may be configured to include double layers or triple layers of third insulating plates 141, and the thickness of the third insulating layer 14 after being laminated is equal to or greater than 0.05 mm and equal to or less than 1.0 mm.

In addition, the second coil winding 15 is disposed between the second insulating layer 12 and the third insulating layer 14. The second coil winding 15 surrounds the through hole 100 planarly. It should be noted that the second coil winding 15 may be disposed on the third insulating layer 14, or disposed on the second insulating plate 121 facing a side surface of the third insulating layer 14 in the second insulating layer 12.

Moreover, the fourth insulating layer 17 includes at least one fourth insulating plates 171. Similarly, the fourth insulating layer 17 may be configured as a single-layer insulating plate or includes at least two fourth insulating plates 171 stacked with each other. For example, the fourth insulating layer 17 may be configured to include two layers or three layers of fourth insulating plates 171, and the thickness of the fourth insulating layer 17 after being laminated is equal to or greater than 0.05 mm and equal to or less than 1.0 mm.

Furthermore, the third coil winding 16 is disposed between the third insulating layer 14 and the fourth insulating layer 17, and the third coil winding 16 surrounds the through hole 100 (the central hole 100') planarly. In some embodiments, the third coil winding 16 may be disposed on the fourth insulating layer 17, or disposed on the third insulating plate 141 facing a side surface of the fourth insulating layer 17 in the third insulating layer 14.

It is worth noticing that the first coil winding 13 and the third coil winding 16 are provided for connection or power input. The first coil winding 13 and the third coil winding 16 may be connected in series or parallel. In addition, the first coil winding 13 and the third coil winding 16 may have the same or different winding turns, and the connection ends thereof are located on the same side.

The fifth insulating layer 19 includes at least two fifth insulating plates 191 stacked with each other. The fifth insulating layer 19 may be configured to include two layers or three layers of fifth insulating plates 191, and the thickness of the fifth insulating layer 19 after being laminated is equal to or greater than 0.05 mm and equal to or less than 1.0 mm.

It should be noted that the insulating plate on the outside portion of the insulating layer contacting the iron cores 20 is not provided with any circuit in an area covered by the iron cores 20. Specifically, in this embodiment, the first insulating plate 111 on the outside portion (the side facing the first iron core 21) of the first insulating layer 11 is not provided with any circuit in the areas covered by the iron cores 20. In addition, the fifth insulating plate 191 on the outside portion (the side facing the second iron core 22) of the fifth insulating layer 19 is not provided with any circuit in the areas covered by the iron cores 20.

Moreover, the fourth coil winding 18 is disposed between the fourth insulating layer 17 and the fifth insulating layer 19, and the fourth coil winding 18 surrounds the through hole 100 (the central hole 100') planarly. In some embodiments, the fourth coil winding 18 may be disposed on the fifth insulating layer 17, or disposed on the fourth insulating plate 171 facing a side surface of the fifth insulating layer 19 in the fourth insulating layer 17.

It is worth noticing that the second coil winding 15 and the fourth coil winding 18 are provided for output or connecting the load. The second coil winding 15 and the fourth coil winding 18 may be connected in series or parallel. In addition, the second coil winding 15 and the fourth coil winding 18 may have the same or different winding turns, and the connection ends thereof are located on the same side.

It should be noted that in this embodiment, a periphery of the first coil winding 13 to a periphery of the fourth coil winding 18 are located on the same location. In addition, a periphery of the first insulating layer 11 to a periphery of the fifth insulating layer 19 are located on the same location. The distance H from the periphery of the first coil winding 13 to the periphery of the fourth coil winding 18 with respect to the periphery of the first insulating layer 11 to the periphery of the fifth insulating layer 19 is at least equal to or greater than 0.1 mm and equal to or less than 1.0 mm.

In this embodiment, the first coil winding 13 and the third coil winding 16 have different winding turns and are connected in series to form a primary coil. In addition, the second coil winding 15 and the fourth coil winding 18 have the same winding turns to form a secondary coil. The first coil winding 13 to the fourth coil winding 18 are stacked to form a configuration of the primary and secondary coils being adjacent and stacked with each other. In some other embodiments, the numbers of insulating layers and the coil windings, and the configuration of stack may be adjusted.

It should be noted that in this embodiment, the high-insulation multilayer planar transformer 1 further includes an insulating glue 30. The insulating glue 30 is filled in the gaps between each coil winding and insulating layer to make the combination more stable, and the effects of flame retardancy, corrosion resistance, insulation, and aging resistance may also be achieved.

Moreover, the minimum safety clearance is required in the safety regulations of transformers, thereby a distance between the primary and the secondary coils needs to meet the safety regulations. Furthermore, though the distance between the primary and the secondary coils of this embodiment is reduced, the high-insulation multilayer planar transformer 1 of this disclosure may still meet the safety regulations through the verification of safety verification companies.

Figure 4:
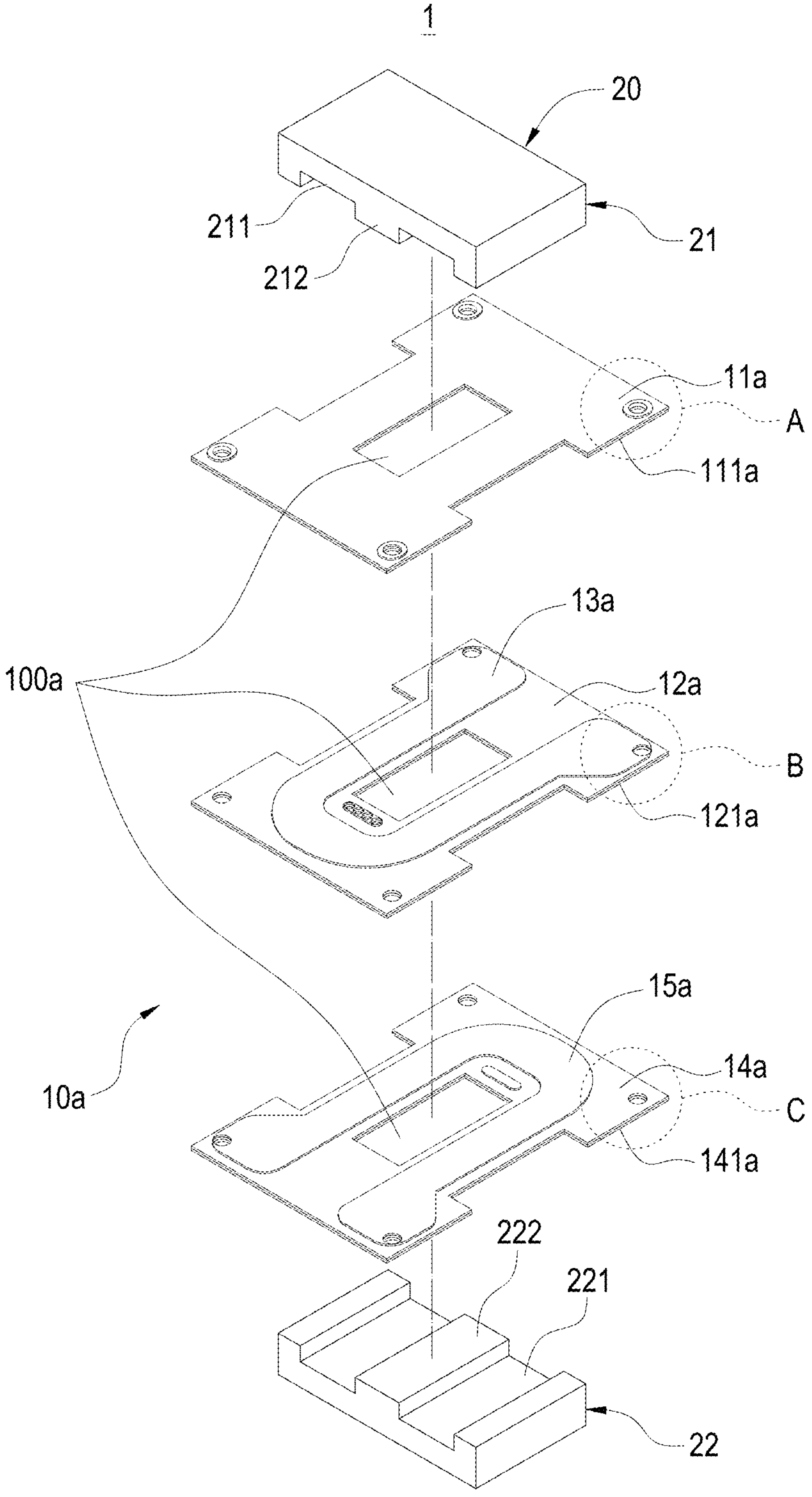
FIG. 4 is a perspective explosion view of another embodiment of the high-insulation multilayer planar transformer of this disclosure.
Figure 4A:
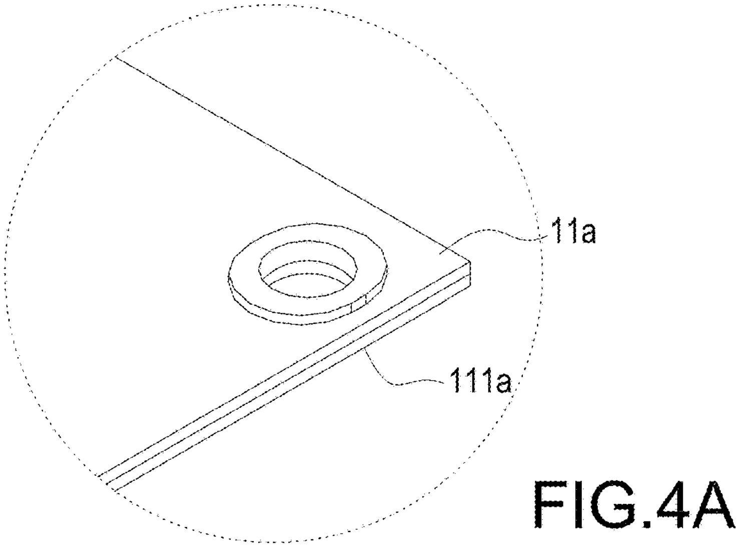
FIGS. 4A, 4B and 4C are enlarged view of circled parts A, B and C in FIG. 4.
Figure 4B:
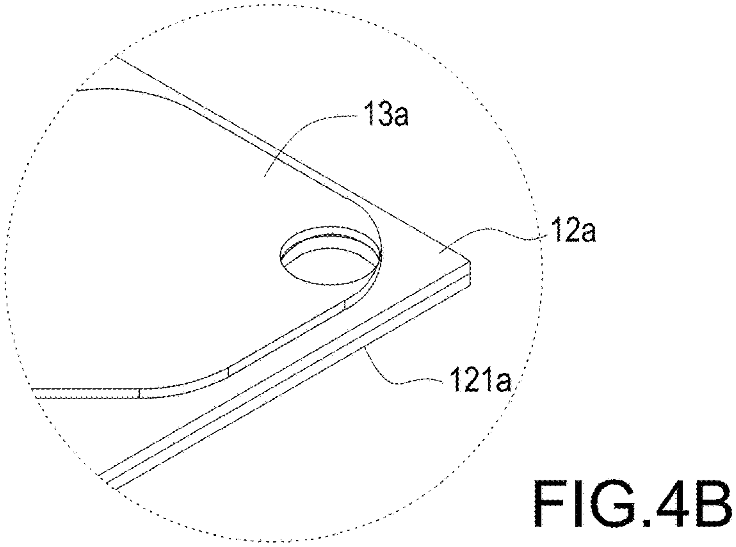
Figure 4C:
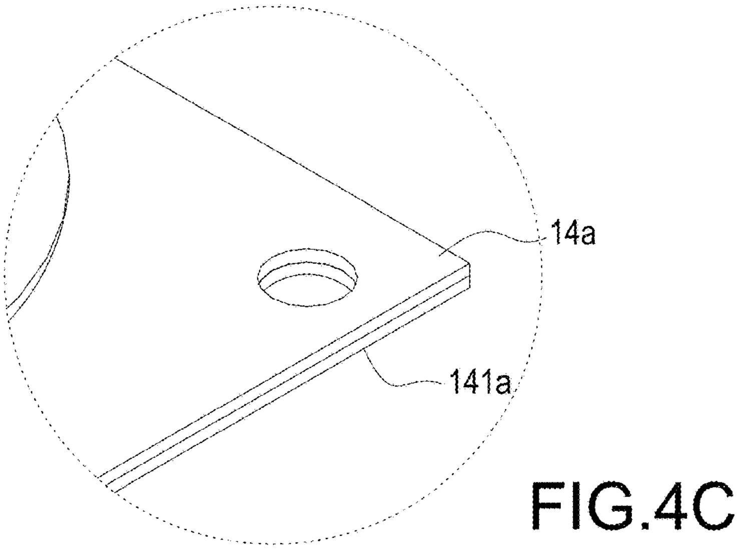

Please further refer to FIG. 4, it depicts a perspective explosion view of another embodiment of the high-insulation multilayer planar transformer of this disclosure; FIGS. 4A, 4B and 4C show enlarged view of circled parts A, B and C in FIG. 4. This embodiment is similar to the previous embodiment, and the difference is that the numbers of insulating layers and coil windings and the configuration of stack are different. In this embodiment, the circuit board integration 10*a* has a through hole 100*a* and includes a first insulating layer 11*a*, a second insulating layer 12*a*, a first coil winding 13*a*, a third insulating layer 14*a* and a second coil winding 15*a*. In addition, the first insulating layer 11*a*, the first coil winding 13*a*, the second insulating layer 12*a*, the second coil winding 15*a* and the third insulating layer 14*a* are stacked sequentially to constitute the circuit board integration 10*a*.

Specifically, the first insulating layer 11*a* includes at least two first insulating plates 111*a* stacked with each other. The second insulating layer 12 includes at least one second insulating plate 121*a*. The first coil winding 13*a* is disposed between the first insulating layer 11*a* and the second insulating layer 12*a*, and the first coil winding 13*a* surrounds the through hole 100 planarly. The third insulating layer 14*a* includes at least two third insulating plates 141*a* stacked with each other. The second coil winding 15*a* is disposed between the second insulating layer 12*a* and the third insulating layer 14*a*, and the second coil winding 15*a* surrounds the through hole 100*a* planarly.

It is worth noticing that this embodiment is the same as the previous embodiment in that the insulating plate on the outside portion of the insulating layer contacting the iron cores 20 is not provided with any circuit in the areas covered by the iron cores 20. Specifically, in this embodiment, the first insulating plate 111*a* on the outside portion (the side facing the first iron core 21) of the first insulating layer 11*a* is not provided with any circuit in the areas covered by the iron cores 20. In addition, the third insulating plate 141*a* on the outside portion (the side facing the second iron core 22) of the third insulating layer 14*a* is not provided with any circuit in the areas covered by the iron cores 20.

Another thing to be noted is that in this embodiment, the first coil winding 13*a* includes a primary coil and a secondary coil. In addition, the second coil winding 15*a* also includes a primary coil and a secondary coil. Furthermore, in some embodiments, the numbers of insulating layers and the coil windings, the configuration of the stack and the arrangement of primary and secondary coils are not limited herein and may be adjusted.

It is worth noticing that the insulating plate of this disclosure may be composed of a glass fiber, or the insulating plate is a Prepreg (PP) formed by drying a glass fiber after dipping the glass fiber into epoxy.

Although this disclosure has been described with reference to the embodiment thereof, it will be understood that the disclosure is not limited to the details thereof. Various substitutions and improvements have been suggested in the foregoing description, and others will occur to those of ordinary skill in the art. Therefore, all such substitutions and improvements are intended to be embraced within the scope of the disclosure as defined in the appended claims.

What is claimed is:

1. A circuit board integration of high-insulation multilayer planar transformer, the circuit board integration comprising:

a first insulating layer, consisting of two first insulating plates stacked with each other;

a second insulating layer, consisting of two second insulating plates stacked with each other;

a first coil winding in a U-shape with two distal ends both located at a first side, disposed between the first insulating layer and the second insulating layer, and surrounding a through hole planarly;

a third insulating layer, consisting of two third insulating plates stacked with each other; and a second coil winding in a U-shape with two distal ends both located at a second side opposite to the first side, disposed between the second insulating layer and the third insulating layer, and surrounding the through hole planarly;

wherein a thickness of the first insulating layer, a thickness of the second insulating layer and a thickness of the third insulating layer are equal to or greater than 0.05 mm and equal to or less than 1 mm respectively, a distance of a periphery of the first coil winding to a periphery of the first insulating layer is equal to or greater than 0.1 mm and equal to or less than 1 mm, and a distance of a periphery of the second coil winding to a periphery of the second insulating layer is equal to or greater than 0.1 mm and equal to or less than 1 mm.

2. The circuit board integration according to claim 1, wherein the first coil winding is disposed on the second insulating layer; and the second coil winding is disposed on the third insulating layer.

3. The circuit board integration according to claim 1, wherein the first insulating plate, the second insulating plate and the third insulating plate comprise a glass fiber.

4. A high-insulation multilayer planar transformer, comprising:

a pair of iron cores, comprising a first iron core and a second iron core arranged oppositely, the first iron core comprising a first base and a first core pillar connected to the first base, and the second iron core comprising a second base and a second core pillar connected to the second base; and a circuit board integration, stacked between the first iron core and the second iron core, comprising:

a first insulating layer, consisting of two first insulating plates stacked with each other;

a second insulating layer, consisting of two second insulating plates stacked with each other;

a first coil winding in a U-shape with two distal ends both located at a first side, disposed between the first insulating layer and the second insulating layer, and surrounding a through hole planarly;

a third insulating layer, consisting of two third insulating plates stacked with each other; and a second coil winding in a U-shape with two distal ends both located at a second side opposite to the first side, disposed between the second insulating layer and the third insulating layer, and surrounding the through hole planarly;

wherein the through hole is inserted with the first core pillar and the second core pillar;

wherein a thickness of the first insulating layer, a thickness of the second insulating layer and a thickness of the third insulating layer are equal to or greater than 0.05 mm and equal to or less than 1 mm respectively, a distance of a periphery of the first coil winding to a periphery of the first insulating layer is equal to or greater than 0.1 mm and equal to or less than 1 mm; and a distance of a periphery of the second coil winding to a periphery of the second insulating layer is equal to or greater than 0.1 mm and equal to or less than 1 mm.

5. The high-insulation multilayer planar transformer according to claim 4, wherein one insulating plate located on an outside portion of the first insulating layer contacting the iron core is free from a circuit in an area covered by the iron core.

6. The high-insulation multilayer planar transformer according to claim 4, wherein the first coil winding is disposed on the second insulating layer; and the second coil winding is disposed on the third insulating layer.

* * * * *